(12) United States Patent
Nilsson (10) Patent No.: US 7,372,397 B2
(45) Date of Patent: May 13, 2008

(54) ENERGY STORAGE IN A RADAR LEVEL GAUGE

(75) Inventor: Leif Nilsson, Linköping (SE)

(73) Assignee: Rosemount Tank Radar AB, Goteborg (SE)

( * ) Notice: Subject to any disclaimer, the term of this patent is extended or adjusted under 35 U.S.C. 154(b) by 111 days.

(21) Appl. No.: 11/144,886

(22) Filed: Jun. 3, 2005

(65) Prior Publication Data

US 2006/0273949 A1   Dec. 7, 2006

(51) Int. Cl.
| | |
|---|---|
| G01S 13/08 | (2006.01) |
| G01S 13/00 | (2006.01) |
| G01S 7/40 | (2006.01) |
| G08B 21/00 | (2006.01) |
| G01R 27/04 | (2006.01) |

(52) U.S. Cl. ............... 342/124; 342/174; 342/175; 340/612; 324/644
(58) Field of Classification Search ............. 342/124; 324/640, 642, 643, 644, 694, 699
See application file for complete search history.

(56) References Cited

U.S. PATENT DOCUMENTS

| | | | | |
|---|---|---|---|---|
| 4,242,665 A | * | 12/1980 | Mate | 340/870.38 |
| 4,459,537 A | * | 7/1984 | McWhorter | 323/224 |
| 5,365,178 A | * | 11/1994 | Van Der Pol | 324/644 |
| 5,416,723 A | * | 5/1995 | Zyl | 713/300 |
| 5,672,975 A | * | 9/1997 | Kielb et al. | 324/644 |
| 5,691,629 A | * | 11/1997 | Belnap | 323/266 |
| 5,847,567 A | * | 12/1998 | Kielb et al. | 324/642 |
| 5,905,646 A | | 5/1999 | Crewson et al. | 363/132 |
| 5,914,591 A | * | 6/1999 | Yasuda et al. | 323/284 |
| 6,014,100 A | | 1/2000 | Fehrenbach et al. | 342/124 |
| 6,191,567 B1 | * | 2/2001 | Sluijs | 323/259 |
| 6,295,018 B1 | * | 9/2001 | Diede et al. | 342/124 |

(Continued)

FOREIGN PATENT DOCUMENTS

GB   2238191 A   5/1991

OTHER PUBLICATIONS

"International Search Report" for PCT/SE2006/000649.

*Primary Examiner*—Thomas H. Tarcza
*Assistant Examiner*—Hien Ly
(74) *Attorney, Agent, or Firm*—Westman, Champlin & Kelly, P.A.

(57) ABSTRACT

A radar level gauge using microwaves for measuring a level of a surface of a product in a container, comprising a microwave unit, processing circuitry connected to said microwave unit, an interface for connecting said radar level gauge externally thereof, and a power management circuitry arranged to provide operating power to said microwave unit and said processing circuitry. The power management circuitry includes a temporary energy store, means for providing said temporary energy store with an intermediate voltage lower than an operating voltage required by said processing circuitry, in order to charge said energy store, and converting means, for converting an output voltage from said temporary energy store up to said operating voltage. According to this design, a sufficient amount of energy can be stored in the temporary energy store, operating at an intermediate voltage lower than the operating voltage of the radar level gauge. This output from the temporary energy store is then converted up to the required operating voltage. An advantage is that the intermediate voltage can be chosen so that the first temporary energy store can store a sufficient amount of power, without violating IS requirements.

42 Claims, 3 Drawing Sheets

U.S. PATENT DOCUMENTS

| | | | |
|---|---|---|---|
| 6,320,532 B1* | 11/2001 | Diede | 342/124 |
| 6,373,261 B1* | 4/2002 | Kielb et al. | 324/644 |
| 6,381,114 B1 | 4/2002 | Mansfield | 361/58 |
| 6,445,192 B1* | 9/2002 | Lovegren et al. | 324/644 |
| 6,535,161 B1 | 3/2003 | McEwan | 342/124 |
| 6,813,318 B1 | 11/2004 | Westfield et al. | 375/295 |
| 6,917,326 B1* | 7/2005 | Tregenza et al. | 342/124 |
| 6,956,382 B2* | 10/2005 | Nilsson | 324/644 |
| 7,053,502 B2* | 5/2006 | Aihara et al. | 307/46 |
| 7,098,843 B2* | 8/2006 | Abrahamsson | 342/124 |
| 2001/0033501 A1* | 10/2001 | Nebrigic | 363/49 |
| 2002/0154052 A1* | 10/2002 | Fehrenbach et al. | 342/124 |
| 2004/0100281 A1* | 5/2004 | NIlsson | 324/644 |
| 2004/0169601 A1* | 9/2004 | Haynes | 342/124 |
| 2004/0174072 A1* | 9/2004 | Bourilkov et al. | 307/66 |
| 2004/0184289 A1* | 9/2004 | Vinciarelli | 363/15 |
| 2004/0201516 A1* | 10/2004 | Lyon | 342/124 |
| 2004/0227494 A1* | 11/2004 | Swanson et al. | 323/268 |
| 2005/0024259 A1* | 2/2005 | Berry et al. | 342/124 |
| 2005/0110468 A1* | 5/2005 | Turner et al. | 320/166 |
| 2005/0206342 A1* | 9/2005 | Aleyraz et al. | 320/101 |
| 2005/0242588 A1* | 11/2005 | Washington | 290/1 A |
| 2005/0264441 A1* | 12/2005 | Abrahamsson | 342/124 |
| 2005/0280575 A1* | 12/2005 | Shima | 342/174 |
| 2005/0285777 A1* | 12/2005 | Karlsson | 342/124 |
| 2006/0012512 A1* | 1/2006 | Jirskog | 342/124 |
| 2006/0055591 A1* | 3/2006 | Eriksson | 342/124 |
| 2006/0114642 A1* | 6/2006 | Liu et al. | 361/500 |
| 2006/0163611 A1* | 7/2006 | Kawabata et al. | 257/197 |

* cited by examiner

ENERGY STORAGE IN A RADAR LEVEL GAUGE

FIELD OF THE INVENTION

The present invention relates to a radar level gauge system using microwaves for measuring a level of a surface of a product in a container. More specifically, the invention relates to energy storage in such a gauge.

BACKGROUND OF THE INVENTION

Radar level gauges are suitably used for making non-contact measurements of the level of products such as process fluids, granular compounds and other materials. An example of such a radar level gauge can include a microwave unit for transmitting microwaves towards the surface and receiving microwaves reflected by the surface, processing circuitry arranged to communicate with said microwave unit and to determine said level based on a relation between transmitted and received microwaves, an interface for connecting said processing circuitry externally of said radar level gauge, and a power management circuitry providing said microwave unit and said processing circuitry with operating power.

In order to ensure a satisfactory signal level of the received echo, the emitted microwaves must have a sufficient power level. The processing of received signals also requires significant power, and in some cases the clock frequency of the processor is increased during the processing in order to enable high speed calculations. In combination, this results in an increased demand of power during certain parts of the measuring cycle. The power requirements are especially high for Frequency Modulated Continuous Wave (FMCW) systems. However, the provision of power is relatively difficult to achieve in practice, since energy is normally a scarce resource in the above-discussed type of gauges.

In particular, limited available power is a problem in systems using a two wire feeding system. Radar level gauges for measuring of a level in a tank, and other types of process sensors, are typically connected with a two-wire interface, where only two lines serve to both supply the sensor with limited power and to communicate a measured and processed measuring signal. The interface can be a 4-20 mA industrial loop with superimposed digital communication, or another two-wire fieldbus, such as Fieldbus Foundation (FF) or Profibus. Other possible interfaces include a four-wire interface, where two lines provide power, and two wires communicate measurement signals. In case of a 4-20 mA loop, the available power is thus dependent upon the signal value of the gauge, so that during periods with low signal value (e.g. around 4 mA) only a very limited power is available. Even during periods of high signal value (e.g. around 20 mA) the available power may not be sufficient to power the processing circuitry and the microwave emitter during a measurement cycle.

For this reason, power management in some form may be required, to distribute the available power between different components and over time. Such power management may include storage of energy in some kind of energy storage device, so that this energy can be used to boost the available power during periods of increased power requirements. The energy storage can take place in specifically designated stand-by periods, following each measurement cycle, or take place throughout the measurement cycle, during periods of low activity.

In the case where measurements are made in a tank containing explosive gas or liquids, or in any other situation where the sensor is located in an explosion endangered area, there is also an issue of explosion protection. Normally, either the installation is made explosion proof by some kind of casement, or its outside electrical connection is made intrinsically safe (IS). The latter case requires that input power, voltage and current do not exceed levels stated by safety regulations (IS requirements). This is ensured by a so called electrical barrier, arranged in the interface to the intrinsically safe area.

However, these IS requirements also limit the levels of energy storage allowed in the installation at given voltage and current levels. Such limitations apply to any energy store present in the system, such as capacitance and inductance, and severely limits the applicability of energy storage solutions as outlined above. In many cases this results in a need for the cumbersome and expensive process of encasing the circuitry, e.g. by molding, and in other cases even encasement is not accepted by the safety regulations as a means to ensure an explosion proof installation.

SUMMARY OF THE INVENTION

It is an object of the present invention to address the above problems, and to provide improved energy storage in a radar level gauge without violating safety regulations (IS requirements).

This object is achieved with a radar level gauge, a power supply circuit and a method according to the appended claims.

The invention is based on the realization that while only a very limited energy storage (e.g. capacitance) is allowed at the operational voltage, the restrictions are much less severe at lower voltages.

According to a first aspect of the present invention, there is provided a radar level gauge comprising a microwave unit for transmitting microwaves towards the surface and receiving microwaves reflected by the surface, processing circuitry connected to said microwave unit and arranged to determine said level based on a relation between transmitted and received microwaves, an interface for connecting said radar level gauge externally thereof, and power management circuitry arranged to provide operating power to said microwave unit and said processing circuitry. The power management circuitry includes a temporary energy store, means for providing said temporary energy store with an intermediate voltage lower than an operating voltage required by said processing circuitry, in order to charge said energy store, and converting means, for converting an output voltage from said temporary energy store up to said operating voltage. According to a second aspect of the present invention, there is provided a power management circuitry for use in a sensor for measuring a process variable, comprising a temporary energy store, means for providing said temporary energy store with an intermediate voltage lower than an operating voltage required by said processing circuitry, in order to charge said energy store, and converting means, for converting an output voltage from said temporary energy store up to said operating voltage.

According to this design, a sufficient amount of energy can be stored in the temporary energy store, operating at an intermediate voltage lower than the operating voltage of the radar level gauge. This output from the temporary energy store is then converted up to the required operating voltage. An advantage is that the intermediate voltage can be chosen so that the first temporary energy store can store a sufficient amount of power, without violating IS requirements.

Further, as the intermediate voltage can be allowed to vary significantly, the temporary energy store can be more effectively used than any corresponding energy store provided at operating voltage, which typically can only be allowed to vary a few tenths of volts.

As temporary energy store can be used a capacitor or any other type of element or combination of elements adapted to store electrical energy when a voltage is applied over it.

The means for providing an intermediate voltage can include a step-down converter, having a high-voltage end for receiving a drive voltage from the interface, and a low-voltage end for supplying a lower voltage, and adapted to essentially conserve power. This means that the output current will be higher than the input power (as the output voltage is lower than the input voltage), allowing for a quick charge of the temporary energy store. The power management circuitry will thus be self-regulating, and boost the current as much as possible while lowering the drive voltage down to the level to be applied over the temporary energy store. The step-down converter can be a DC/DC converter of the kind where supplied power is maintained through the conversion.

The second converting means may include a step-up converter having a low-voltage end for receiving an input voltage, and a high-voltage end for providing a voltage higher than said input voltage, and adapted to essentially conserve power. The step-up converter can be of similar kind as the step-down converter.

The low-voltage end of the step-up converter can be connected directly to the temporary energy store, or be connected via some voltage modifying circuitry (e.g. voltage divider).

The means for converting the charging voltage up to the operating voltage can include a second temporary energy store, arranged for smoothing the operating voltage. As the main energy storage is handled by the temporary energy store at the intermediate voltage, the second temporary energy store can be small enough so as to not violate the IS requirements, while still providing smoothing of the operating voltage.

The interface can be adapted to receive power in an intrinsically safe manner, typically by means of an electrical barrier. The interface can be a two-wire interface, arranged both to transmit measurement data to a remote location and to receive power for operation of the system. For example, the interface can be a 4-20 mA industrial loop with superimposed digital communication (HART), a Fieldbus Foundation bus, or a Profibus. Such loops are widely used to power radar level gauges. Alternatively, the interface can be four-wire interface.

The IS requirements basically set a limitation for the amount of energy storage that is allowed at a given voltage. In some applications, the operating voltage is as low as 3 V. However, due to diode characteristics, component tolerances and safety margins, the IS requirements must be fulfilled for a voltage as high as 9 V. An intermediate voltage that does not exceed 2V will then allow a significantly higher energy storing capacity (e.g. capacitance) without violating the IS requirements (IS requirements must then be fulfilled for a voltage around 3 V). In some applications, the intermediate voltage is advantageously even lower, and does not exceed 1V.

It should be noted, however, that the present invention also is applicable in situations where the operating voltage is significantly higher, e.g. 15 V. At such operating voltages, very little energy storage is allowed under the IS requirements. Even an intermediate voltage as high as 10 V will therefore allow for significantly more energy storage and may be very advantageous.

The radar level gauge can further comprise means for by-passing the temporary energy store, in dependence of a control signal. Such by-pass may be advantageous for example during startup of the processing circuitry. The by-passing means can be provided by the mentioned step-down converter, by providing it with a second low-voltage end for supplying the operating voltage, and a control port, for receiving a control signal activating one of the two low-voltage ends.

The processing circuitry can further be arranged to receive a monitor signal indicative of the output voltage from the temporary energy store. The processing circuitry can further provide the mentioned control signal in response to this monitor signal, and/or initialize a new measurement cycle in dependence of this monitor signal. The monitor signal also provides status information about the temporary energy store.

According to one embodiment, the microwave unit is adapted to emit pulsed signals, and the processing circuitry is adapted to determine a filling level of the container based on the time between the emission of a pulsed signal and the reception of the reflected signal. This type of measuring is referred to as pulsed measuring.

According to a second embodiment, the microwave unit is adapted to emit waves over a range of frequencies, and the processing circuitry is adapted to determine a filling level of the container based on a mix of the emitted signal and the reflected signal. This type of measuring is referred to as FMCW (Frequency Modulated Continuous Wave).

According to a third embodiment of the present invention, there is provided a method for providing operating power to a sensor for detecting a process variable, comprising storing energy in an temporary energy store at an intermediate voltage lower than an operating voltage required by said sensor, and converting an output voltage from said temporary energy store up to said operating voltage.

Preferably, the method further comprises converting a drive voltage, down to said intermediate voltage. Preferably, the input power is conserved through the conversion, so that the input current is boosted to a higher current, thereby effecting quick charging of said temporary energy store. This allows for efficient use of the power which can be provided in an intrinsically safe manner.

BRIEF DESCRIPTION OF THE DRAWINGS

This and other aspects of the present invention will now be described in more detail, with reference to the appended drawings showing a currently preferred embodiment of the invention.

DETAILED DESCRIPTION OF PREFERRED EMBODIMENTS

Figure 1:
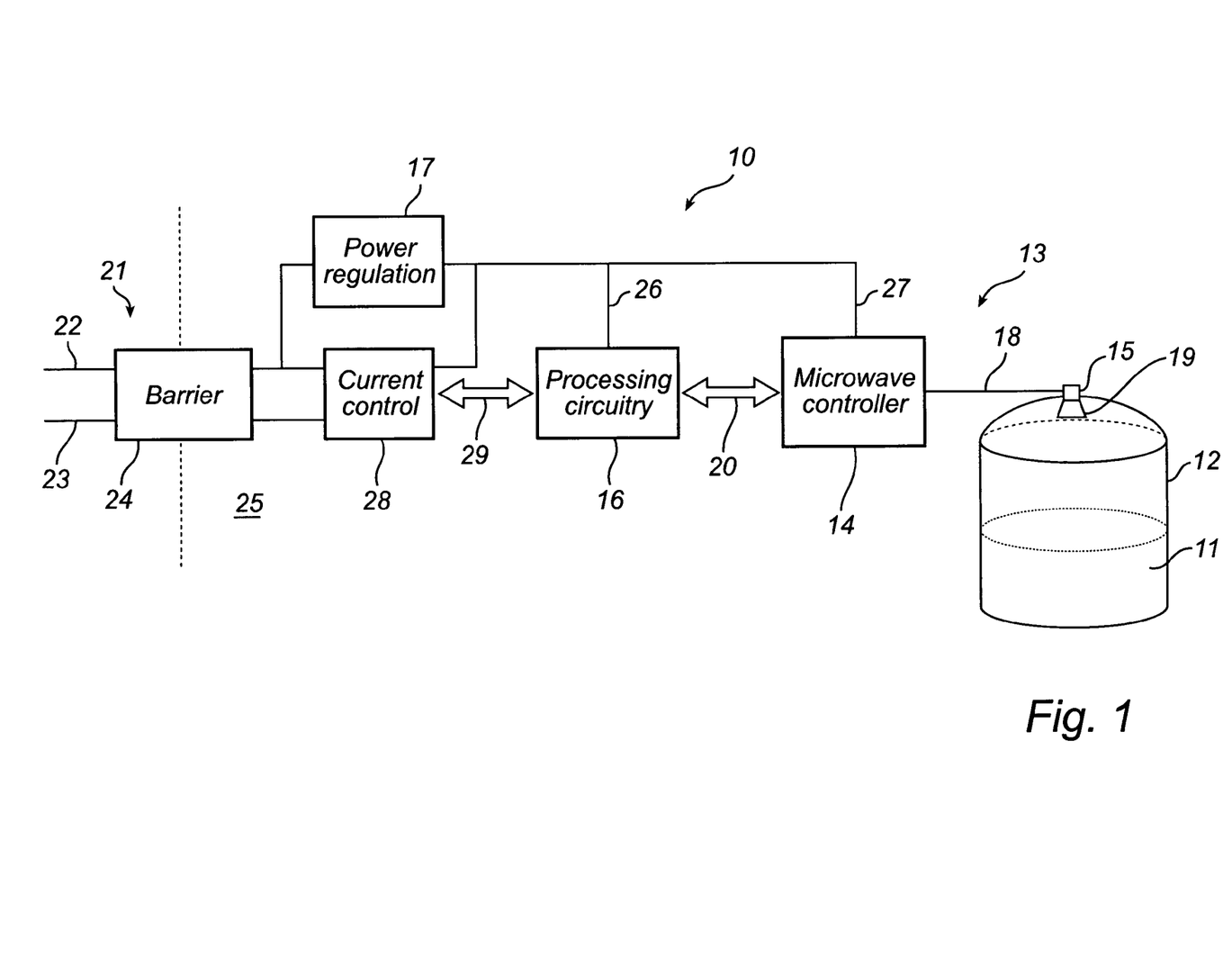
FIG. 1 is a functional block diagram of a radar level gauge in which the present invention can be implemented.

FIG. 1 shows a schematic block diagram of a radar level gauge 10, in which the present invention advantageously can be implemented. The radar level gauge is arranged to determine the position of the surface of a material 11 in a tank 12 (i.e. the level of the material 11). The radar level gauge 10 includes a microwave unit 13, adapted to emit waves into the tank, and to receive reflected microwaves, processing circuitry 16 for communicating with said microwave unit and for determining a measurement result based on a relation between transmitted and received microwaves, and a power management unit 17 for providing required power to the processing circuitry and the microwave unit 13.

The microwave unit 13 can comprise a microwave controller 14, a microwave emitter/receiver 15, and a signal transfer medium 18 connecting the emitter/receiver 13 to the controller 14. The controller 14 is connected to the processing circuitry 16 by a data bus 20, and is adapted to generate a microwave signal in accordance with control data from the processing circuitry 16. The controller 14 can comprise a transmitter, a receiver, a circulator and any control circuitry required to manage these components. Further, the controller 14 can comprise an A/D-converter for digitizing a tank signal, i.e. a signal received from the tank. The emitter/receiver 15 can, as shown in FIG. 1, include a free radiating antenna 19 in the top of the tank, or alternatively the emitter/receiver 15 can include a probe extending into the tank. The signal transfer medium 18 can be a wire or cable, but can also include more sophisticated wave guides. In case of a explosive or otherwise dangerous content in the tank 12, the signal transfer medium 18 may include an air tight seal passing through the tank wall. It is also possible that the controller 14 is connected directly to the emitter/receiver 15 with a suitable terminal, or that the emitter/receiver 15 is arranged on the same circuit board as the controller 14, in which case the signal transfer medium simply may be a track on the circuit board.

The system 10 is connected to an interface 21, for providing the system 10 with drive power, and possibly also for communicating a measurement result externally to the gauge system. In the illustrated example, the interface 21 is a two-wire interface, comprising two lines 22, 23, and an electrical barrier 24. The barrier 24 ensures that the area 25, in which the gauge system 10 is installed, is intrinsically safe, i.e. that power, current and voltage are kept below given limits, reducing the risk of hazard. An example of such a two-wire interface, at the same time providing drive power and communicating a measurement signal, is a 4-20 mA industrial loop.

The power management unit 17 is connected to one of the lines 22 and is adapted to convert the voltage in the two-wire interface (typically in the order of 20 V), into an operating voltage suitable for the circuitry 16 and the microwave driver 14, typically in the order of 3 V. In the simplest case, the power management unit 17 is a DC/DC step down converter and a smoothing capacitor. The power management unit is connected to the circuitry 16 via a line 26 and to the microwave driver 14 via a line 27.

Both lines 22, 23 are further connected to a current control unit 28, which is controlled by the processing circuitry 16 via a digital bus 29. The bus 29 also carries communication according to the HART protocol, to be superposed in the current in the loop 22, 23. The control unit 28 can be supplied with drive voltage from the power management unit 17.

In use, the processing circuitry 16 controls the microwave controller 14 to generate a measurement signal to be emitted into the tank 12 by the emitter/receiver 15. This signal can be a pulsed signal (pulsed level gauging) or a continuous signal with a frequency varying over a certain range (Frequency Modulated Continuous Wave, FMCW). The microwave emitter 15 acts as an adapter, enabling the signal generated in the controller 14 to propagate into the tank 12 as microwaves, which can be reflected by the surface of the material 11. A tank signal, i.e. the emitted signal and its echo, or a mix of emitted and reflected signals, is received by the emitter/receiver 15, and communicated to the microwave controller 14, where it is received and A/D converted. The digitized signal is then provided to the processing circuitry 16 via bus 20, and the processing circuitry 16 determines a measurement result based on a relation between the emitted and received waves. The measurement result is then communicated to the current control unit 28 via bus 29, and the current flowing through the current control unit 28 is regulated so that the total current in the current loop corresponds to the measurement result.

Figure 2:
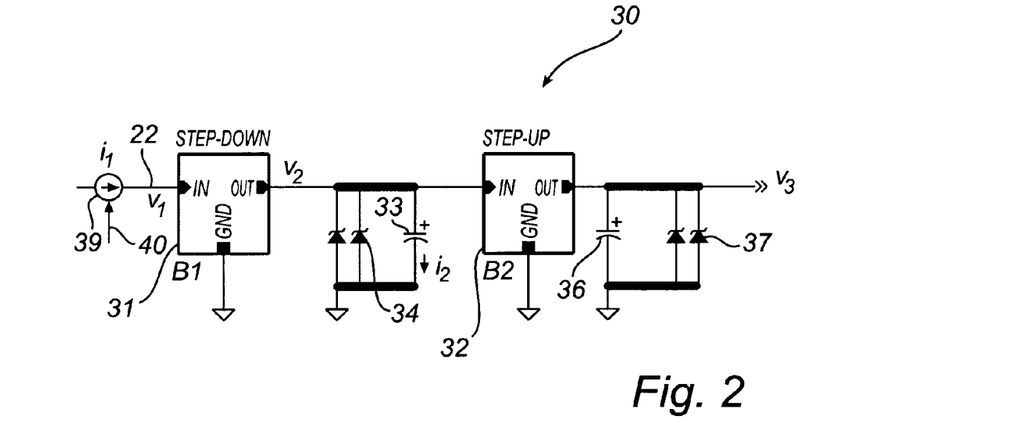
FIG. 2 is a schematic circuit diagram of a first embodiment of a power management circuitry according to a first embodiment of the invention.

FIG. 2 shows a power management circuitry 30 according to a first embodiment of the invention. This circuitry can advantageously be used as or be incorporated in the power management unit 17 in FIG. 1. According to this embodiment, the circuitry 30 includes a DC/DC step-down converter 31, here referred to as a boost converter, and a DC/DC step-up converter 32 connected in series. Both converters are of the type that perform voltage conversion while maintaining the input power. (Of course, this is an ideal situation, in reality there will be a slight power loss due to conversion efficiency.) In between the two converters is provided a temporary energy store, here in the form of a reservoir capacitor 33, connected in parallel with a plurality of redundant safety diodes 34. Of course, the temporary energy store may include other components in stead of or in addition to the capacitor 33. For example, the temporary energy store may include a resistance in series with the capacitor 33, in order to safeguard the capacitor against peak voltages. The resistance should preferably be so small that the voltage drop across this resistance is negligible at the typical currents. In the illustrated example the capacitor 33 and diodes 34 are clamped between error safe conducting tracks 35, therefore requiring only two safety diodes 34. On the other side of the step-up converter 32 a second temporary energy store is provided, here in the form of a smoothing capacitor 36, also connected in parallel with a plurality of safety diodes, here zener diodes 37.

The circuitry 30 preferably also includes a current limiting unit 39. The purpose of the current limiting unit 39 is to ensure that the power consumed by the power management unit 17 does not create a current in the loop exceeding the current value corresponding to the measurement value determined by the gauge. If, for example, the measurement result corresponds to a current in the loop of 5 mA, the current management unit 17 must not consume power so that the current in the loop exceeds 5 mA. This is ensured by the current limiting unit 39. In a very simple case, the limiting unit 39 is just a fixed current limiter, limiting the current to the minimum value of the current loop, e.g. 4 mA. Alternatively, the current limiting unit can be controlled in accordance with the currently available current in the loop. For this purpose, a control signal 40 can be provided from the control unit 28, or directly from the processing circuitry 16.

In use, the boost converter 31, converts the supply voltage v1 on line 22 (typically in the order of 20 V) down to a significantly lower intermediate voltage v2 (typically in the order of 1 V). At the same time as the voltage is stepped down, the current i2 delivered by the converter will be higher than the input current i1 provided from line 22, as only a very small fraction of the input power is consumed by the converter 31. The capacitor 33 is therefore charged at the intermediate voltage v2, but with the boosted current i2, ensuring a short charging time. As the voltage is low across the capacitor 33, a large amount of energy can be stored by the capacitor without violating IS requirements. As an example, energy in the order of mWs can be stored in the capacitor 33. At an intermediate voltage of 1 V, this corresponds to a capacitance of 6000 µF.

The intermediate voltage v2 is subsequently stepped up to a higher level v3 by the step-up converter 32. The voltage v3 can be essentially equal to the operating voltage of the processing circuitry 17 and/or microwave unit 13, typically in the order of 3 V. At this voltage level, only a limited amount of capacitance is allowed, restricting the size of the smoothing capacitor 36. The voltage v3 can be higher than the required operating voltage, in which case a voltage divider may be used to provide the correct operating voltage.

When the processing circuitry demands more power than is available from the interface 21, the reservoir capacitor 33 will be discharged, thereby providing additional power needed e.g. for powering the microwave unit 13 during a pulse. This will be especially important when the available current in the current loop is low (i.e. during periods of a low measurement value).

Figure 3:
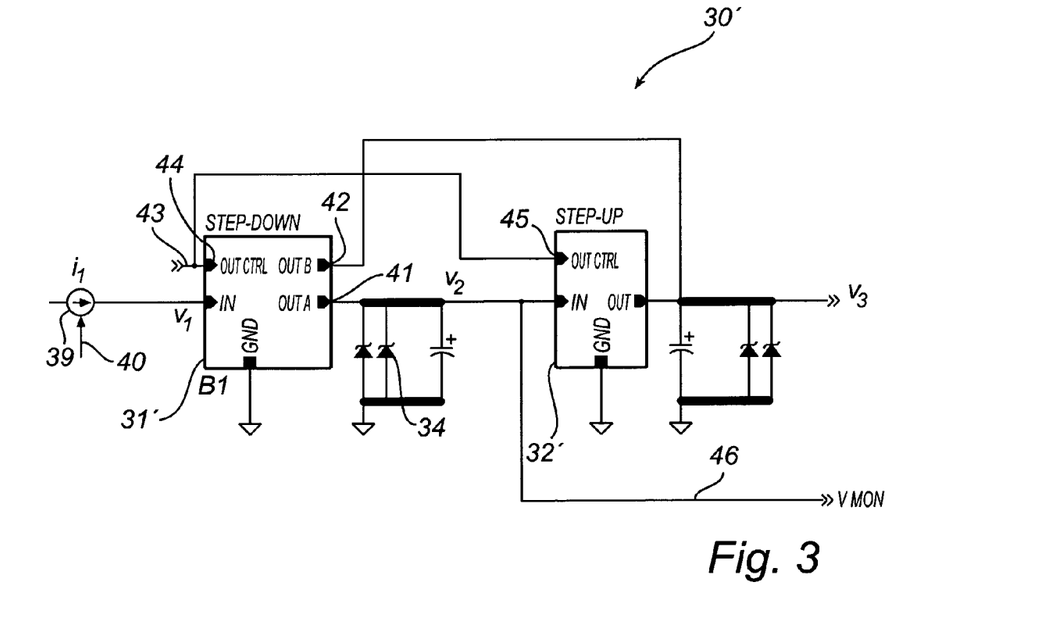
FIG. 3 is a schematic circuit diagram of a second embodiment of a power management circuitry according to a first embodiment of the invention.

According to a further embodiment of the power management circuitry 30', shown in FIG. 3, the step-down converter 31' is provided with two output terminals 41, 42. The first terminal 41 is adapted to provide the low voltage v1 to the capacitor 33 as mentioned above. The second terminal 42 is adapted to provide a higher voltage level v3 to the capacitor 36. The terminals are selectively activated in response to a control signal 43 provided to a control port 44. Further, the step-up converter 32' is also provided with a control port 45, which is connected to the same control signal 44. The converter 32' is adapted to be inactivated when the control signal is such that the step-down converter provides voltage v3 to the capacitor 36.

Figure 4:
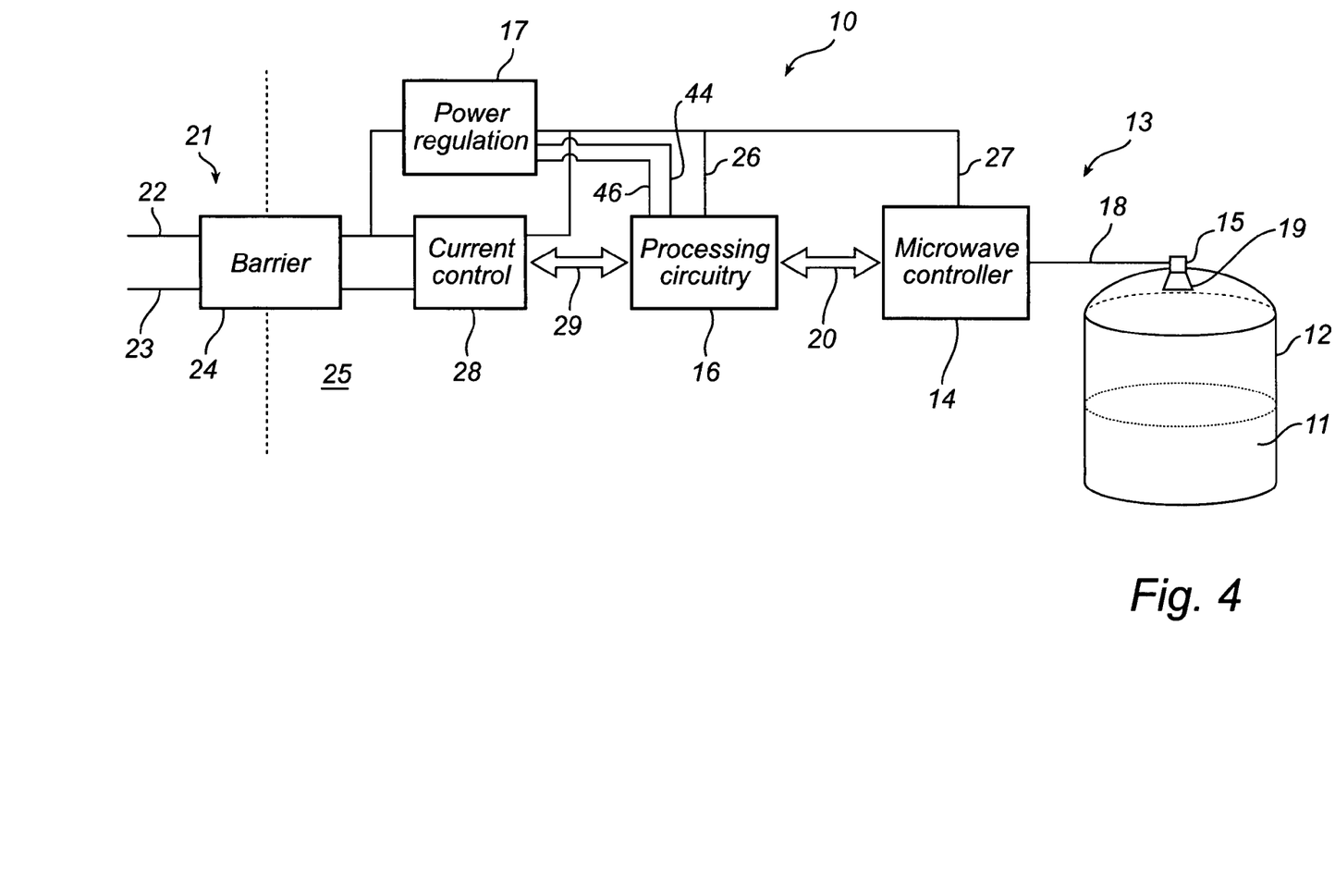
FIG. 4 is a functional block diagram of a radar level gauge provided with a power management circuitry according to FIG. 3.

FIG. 4 illustrates the system in FIG. 1, where the power management unit 17 is adapted to include a power management circuitry 30' according to the embodiment in FIG. 3. The processing circuitry 16 here receives a monitor readout 46 from the power management unit 17 corresponding to the voltage v2 in FIG. 3, and returns the control signal 43 to the power management circuitry 17. This control of the power management circuitry 17 provides the possibility to bypass the power storage in capacitor 33 during periods when no such storage is required, e.g. when a large current is available on the loop 22, 23, or when the processing circuitry 16 requires an immediate voltage, e.g. during startup.

The monitor readout also provides a possibility to optimize the duration of the measurement cycle, in order to ensure that sufficient charging of the temporary energy store can be effected between measurements. In principle, monitor readout 46 can be used to initialize the next measurement cycle as soon as the temporary energy store is sufficiently charged. Such control would make the duration of the cycle dynamic, so that it will depend on the available power, i.e. the current in the loop.

The monitor readout 46 can also be used as an indication of the performance of the temporary energy store. In the case of a capacitor used as energy store, its performance will typically decline, which can be detected in the monitor readout 46. This information can be used to signal the need for replacement of the temporary energy store.

The power management circuitry according to the invention is not necessarily provided in only one place in the radar level gauge, but may be distributed in the system. For example, the circuitry described with relation to FIGS. 2 and 3 may be implemented directly in the microwave controller 14.

What is claimed is:

1. A radar level gauge using microwaves for measuring a level of a surface of a product in a container, comprising:
    a microwave unit for transmitting microwaves towards the surface and receiving microwaves reflected by the surface,
    processing circuitry connected to said microwave unit and arranged to determine said level based on a relation between transmitted and received microwaves,
    an interface for connecting said radar level gauge externally thereof, and
    power management circuitry arranged to provide operating power to said microwave unit and said processing circuitry, said power management circuitry including:
    a temporary energy store,
    first converting means for converting a drive voltage from said interface to an intermediate voltage, lower than an operating voltage required by said processing circuitry,
    means for providing said temporary energy store with said intermediate voltage, in order to charge said energy store, and
    second converting means, for converting an output voltage from said temporary energy store up to said operating voltage.

2. The radar level gauge according to claim 1, wherein said first converting means include a step-down converter, having a high-voltage end for receiving said drive voltage, and a low-voltage end for supplying a lower voltage, said step-down converter being adapted to essentially conserve power.

3. The radar level gauge according to claim 1, wherein said second converting means includes a step-up converter having a low-voltage end for receiving an input voltage, and a high-voltage end for providing a voltage higher than said input voltage, said step-up converter being adapted to essentially conserve power.

4. The radar level gauge according to claim 3, wherein the low-voltage end of said step-up converter is connected directly to said temporary energy store.

5. The radar level gauge according to claim 1, wherein said converting means includes a second temporary energy store, for smoothing said operating voltage.

6. The radar level gauge according to claim 1, wherein said interface is arranged to receive power in an intrinsically safe manner.

7. The radar level gauge according to claim 6, wherein said intermediate voltage is chosen so that said radar level gauge fulfills any intrinsically safe requirements, even when said temporary energy store is adapted to provided sufficient power for driving said microwave unit and said processing circuitry.

8. The radar level gauge according to claim 7, wherein said intermediate voltage does not exceed 2 V.

9. The radar level gauge according to claim 8, wherein said intermediate voltage does not exceed 1.5 V.

10. The radar level gauge according to claim 1, wherein said interface is a two-wire interface, arranged both to transmit measurement data to a remote location and to receive power for operation of the radar level gauge.

11. The radar level gauge according to claim 10, further comprising a current control unit, adapted to regulate the current in the two-wire interface in accordance with the measured level.

12. The radar level gauge according to claim 1, further comprising means for by-passing said temporary energy store, in dependence of a control signal.

13. The radar level gauge according to claim 2, wherein said step-down converter is provided with a second low-voltage end for supplying said operating voltage, and a control port, for receiving a control signal activating of one of the two low-voltage ends.

14. The radar level gauge according to claim 12, wherein said processing circuitry is further arranged to receive a monitor signal indicative of the output voltage from the temporary energy store, and to provide said control signal in response to said monitor signal.

15. The radar level gauge according to claim 1, wherein said processing circuitry is further arranged to receive a monitor signal indicative of the output voltage from the temporary energy store, and to initialize a new measurement cycle in dependence of said monitor signal.

16. The radar level gauge according to claim 1, wherein the microwave unit is adapted to emit pulsed signals, and wherein the processing circuitry is adapted to determine a filling level of the container based on the time between the emission of a pulsed signal and the reception of the reflected signal.

17. The radar level gauge according to claim 1, wherein the microwave unit is adapted to emit waves over a range of frequencies, and wherein the processing circuitry is adapted to determine a filling level of the container based on a mix of the emitted signal and the reflected signal.

18. A power management circuitry for use in a sensor for detecting a process variable, comprising:
a temporary energy store,
first converting means for converting a drive voltage, higher than an operating voltage required by said processing circuitry, to an intermediate voltage, lower than said operating voltage,
means for providing said temporary energy store with said intermediate voltage, in order to charge said energy store, and
second converting means for converting an output voltage from said temporary energy store up to said operating voltage.

19. A power management circuitry according to claim 18, wherein said first converting means include a step-down converter, having a high-voltage end for receiving said drive voltage, and a low-voltage end for supplying a lower voltage, said step-down converter being adapted to essentially conserve power.

20. A power management circuitry according to claim 18, wherein said second converting means includes a step-up converter having a low-voltage end for receiving an input voltage, and a high-voltage end for providing a voltage higher than said input voltage, said step-up converter being adapted to essentially conserve power.

21. A power management circuitry according to claim 20, wherein the low-voltage end of said step-up converter is connected directly to said temporary energy store.

22. A power management circuitry according to claim 18, wherein said converting means includes a second temporary energy store, arranged for smoothing said operating voltage.

23. A method for providing operating power to a sensor for detecting a process variable, comprising:

converting a drive voltage, higher than an operating voltage required by said processing circuitry, to an intermediate voltage, lower than said operating voltage,
storing energy in a temporary energy store at said intermediate voltage,
converting an output voltage from said temporary energy store up to said operating voltage, and
providing said operating voltage to microwave unit which transmits and receives microwaves.

24. The method according to claim 23, further comprising:
converting said drive voltage down to said intermediate voltage, while increasing the current through said temporary energy store, thereby effecting quick charging of said temporary energy store.

25. The method according to claim 23, further comprising:
receiving said drive voltage in an intrinsically safe manner via an interface of said radar level gauge.

26. The method according to claim 23, further comprising:
determining that energy storage is not required, and, in such case, by-passing said temporary energy store.

27. The method according to claim 23, further comprising:
initializing a new measurement cycle in dependence of a monitor signal indicative of the voltage across said temporary energy store.

28. The method according to claim 23, wherein the radar level gauge is adapted to emit pulsed signals, and wherein processing circuit is adapted to determine a filling level of the container based on the time between the emission of a pulsed signal and the reception of the reflected signal.

29. The method according to claim 23, wherein the radar level gauge is adapted to emit waves over a range of frequencies, and wherein the processing circuitry is adapted to determine a filling level of the container based on a mix of the emitted signal and the reflected signal.

30. A radar level gauge using microwaves for measuring a level of a surface of a product in a container, comprising:
a microwave unit for transmitting microwaves towards the surface and receiving microwaves reflected by the surface,
processing circuitry connected to said microwave unit and arranged to determine said level based on a relation between transmitted and received microwaves,
an interface for connecting said radar level gauge externally thereon, and
power management circuitry arranged to provide operating power to said microwave unit and said processing circuitry, said power management circuitry including:
a step-down converter, having a high-voltage end for receiving a drive voltage from said interface, and a low-voltage end for supplying a lower voltage, for converting a drive voltage received from said interface down to an intermediate voltage lower than an operating voltage required by said processing circuitry,
a first temporary energy store, arranged to be provided with said intermediate voltage in order to store energy,
a step-up converter having a low-voltage end for receiving a low voltage, and a high-voltage end for providing a voltage higher than said low voltage, for converting an output voltage from said temporary energy store up to said operating voltage, and
a second temporary energy store, arranged to smooth said operating voltage.

31. The radar level gauge according to claim 30, wherein the low-voltage end of said step-up converter is connected directly to said temporary energy store.

32. The radar level gauge according to claim 30, wherein said interface is arranged to receive power in an intrinsically safe manner.

33. The radar level gauge according to claim 32, wherein said intermediate voltage is chosen so that said radar level gauge fulfills any intrinsically safe requirements, even when said temporary energy store is adapted to provide sufficient power for driving said microwave unit and said processing circuitry.

34. The radar level gauge according to claim 33, wherein said intermediate voltage does not exceed 2 V.

35. The radar level gauge according to claim 34, wherein said intermediate voltage does not exceed 1.5 V.

36. The radar level gauge according to claim 30, wherein said interface is a two-wire interface, arranged both to transmit measurement date to a remote location and to receive power for operation of the radar level gauge.

37. The radar level gauge according to claim 36, further comprising a current control unit, adapted to regulate the current in the two-wire interface in accordance with the measurement result.

38. The radar level gauge according to claim 30, wherein said step-down converter is provided with a second low-voltage end for supplying said operating voltage, and a control port, for receiving a control signal activating one of the two low-voltage ends.

39. The radar level gauge according to claim 38, wherein said processing circuitry is further arranged to receive a monitor signal indicative of the voltage across said temporary energy store, and to provide said control signal in response to said monitor signal.

40. The radar level gauge according to claim 30, wherein said processing circuitry is further arranged to receive a monitor signal indicative of the voltage across said temporary energy store, and to initialize a new measurement cycle in dependence of said monitor signal.

41. The radar level gauge according to claim 30, wherein the microwave unit is adapted to emit pulsed signals, and wherein the processing circuitry is adapted to determine a filling level of the container based on the time between the emission of a pulsed signal and the reception of the reflected signal.

42. The radar level gauge according to claim 30, wherein the microwave unit is adapted to emit waves over a range of frequencies, and wherein the processing circuitry is adapted to determine a filling level of the container based on a mix of the emitted signal and the reflected signal.

* * * * *

UNITED STATES PATENT AND TRADEMARK OFFICE
CERTIFICATE OF CORRECTION

PATENT NO. : 7,372,397 B2  
APPLICATION NO. : 11/144886  
DATED : May 13, 2008  
INVENTOR(S) : Leif Nilsson

Page 1 of 1

It is certified that error appears in the above-identified patent and that said Letters Patent is hereby corrected as shown below:

Col. 10, line 49, change "thereon" to --thereof--.

Signed and Sealed this

Twenty-eighth Day of July, 2009

JOHN DOLL  
*Acting Director of the United States Patent and Trademark Office*